W. & R. A. CASWELL.
TANDEM DRAFT CONNECTION FOR HARVESTERS AND THE LIKE.
APPLICATION FILED MAR. 29, 1912.
1,044,744.
Patented Nov. 19, 1912.
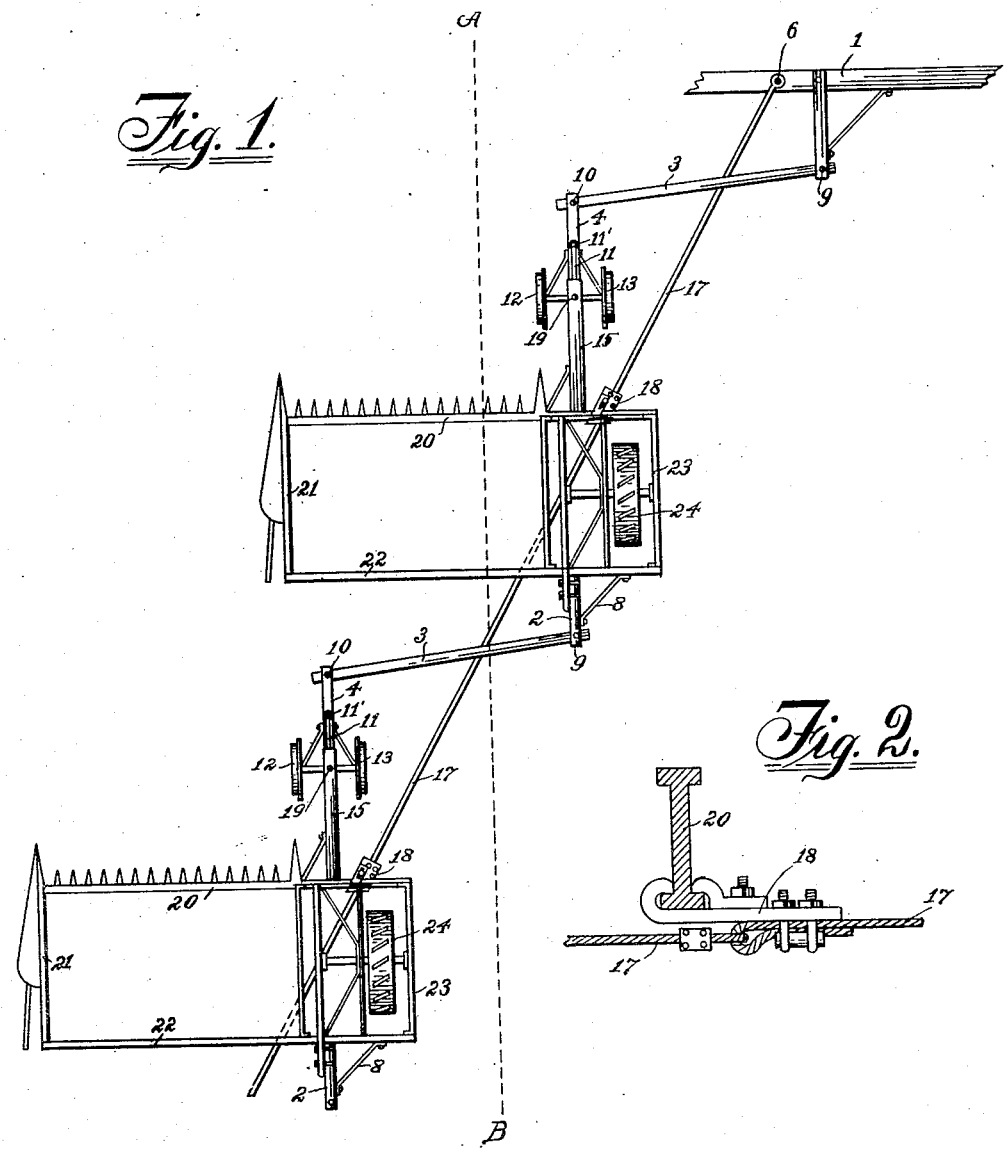

UNITED STATES PATENT OFFICE.

WALLACE CASWELL AND RICHARD ANDREW CASWELL, OF CHEROKEE, IOWA.

TANDEM DRAFT CONNECTION FOR HARVESTERS AND THE LIKE.

1,044,744.

Specification of Letters Patent. Patented Nov. 19, 1912.

Application filed March 29, 1912. Serial No. 687,211.

*To all whom it may concern:*

Be it known that we, WALLACE CASWELL and RICHARD ANDREW CASWELL, citizens of the United States, residing at Cherokee, county of Cherokee, State of Iowa, have invented certain new and useful Improvements in Tandem Draft Connections for Harvesters and the Like; and we do hereby declare the following to be a full, clear, and exact description of the invention, such as will enable others skilled in the art to which it appertains to make and use the same.

This invention relates to harvesters and the like, and particularly to that type which is provided with offset working elements, each adapted to follow one behind the other, to work upon an area adjacent that which is worked upon by the preceding element. Heretofore in such machines the offset parts have been rigidly connected, or else manually operable steering devices were necessary to cause said offset parts to retain their relative positions when the machine was making a turn. It is obvious that a plurality of offset, loosely, connected cutting elements of a harvester, when making a turn, would tend to follow behind the preceding drawing force in the shortest possible path. The cutting elements would therefore "cut corners" and a quantity of grain would be left standing at each corner. Even in cases therefore, where the elements have been held in offset relation, some manually operable steering means was necessary in connection with each element to prevent it from so cutting corners.

The object of this invention is to provide a harvester or the like in which the working elements are automatically guided, off to one side, in such positions that each element will cut its full swath without the engine or any part of the mechanism going into the standing grain, this condition being true even when the harvester is making a turn.

Broadly, the invention consists in providing in addition to a motion transmitting interconnection between the several elements, a mechanism comprising a steering truck carried by one element and operated by connections between said truck and the preceding element, such that when the preceding element is deflected from its course, the following element will be automatically deflected from its course. Consequently, the preceding element in traveling in any course whatever will direct the following element in a course, which is always substantially parallel to the course taken by said preceding element.

To illustrate the invention, a harvesting machine has been used for an example, but it is obvious that the invention is applicable in all cases where offset working parts are used, such as in plows, rollers, harrows and similar devices.

A harvesting machine embodying the invention is depicted in the accompanying drawing, but various modifications may be made, without departing from the spirit or scope of the invention.

In the drawing:—Figure 1 is a plan view of a portion of a harvesting machine embodying the invention; Fig. 2 is a detail view showing the manner of connecting the draw cable to the working elements.

In these views, like reference characters refer to corresponding parts.

The engine for drawing the working elements not forming any part of the invention, has been omitted, but the draw bar of such an engine is shown at 1. Two working elements are shown whose frames are formed by the rectangularly disposed elements, 20, 21, 22 and 23. Obviously, any number of such elements might be used and each element might be of any construction whatsoever. These elements are connected to the draw bar 1 of the engine at 6, preferably by a draw cable 17, the portions of which, between the working elements, being preferably independent sections looped together or otherwise connected, as shown clearly in Fig. 2. The portion of the cable in advance of the working element is rigidly connected to the same in any convenient manner, such as by the clamp 18 secured to the front member 20 of each element. The cable is preferably first doubled back upon itself to form a loop and then said loop is secured to the clamp. A loop is formed in the following cable portion which is linked with said first loop, as further shown by Fig. 2. This construction permits of a certain degree of swiveling action, between the elements, but obviously any kind of a mechanism might be used, which would permit of such a relation.

Each working element is preferably provided with a forwardly extending tongue 15, which is suitably braced with respect to the element. Pivoted to each of said tongues as at 19, is a steering truck provided with wheels 12 and 12, preferably of the flanged type. This truck further comprises a stub tongue 4 held in a substantially parallel relation to the ground by a bracket 11, secured to the stub tongue 4 at 11, and pivotally connected to the tongue 15 at 19. The guiding mechanism for each of these steering trucks preferably consists of extensions or rearwardly extending tongues 2 made rigid with the element frames by braces 8. Interconnecting the extremities of this extension and the stub tongues 4 of the steering trucks, is a lever or offsetting rod 3 pivoted to the extension 2 at 9 and to the stub tongue 4 at 10.

It will be noted that the first working element is guided in a manner identical with that just described. The stub tongue 4 of the first truck being guided by the connecting lever or offsetting rod 3 and an extension on the draw bar of the engine corresponding to the extension on the rear of each working element. Suitable wheels are provided for supporting the weight of the working element frames, such as those shown at 24.

The operation of such a construction is as follows: When the engine is traveling in a straight line A—B, the tendency of the draw cable 17 is to cause the working elements to follow directly behind each other in a straight line, each element following directly behind the point 6 at which the draw cable is connected. Due, however, to the connections 3 between the extensions 2 and the stub tongues 4, it is obvious that the steering truck of each working element will be guided to cause said elements to pursue paths, each of which will be substantially parallel to the path taken by the preceding element. In the position of offset relation as shown in the drawing, the parts are so arranged that the steering trucks will be directed straight ahead, and hence, when the machine is traveling in a straight course, the parts will retain their relative offset portions. Assuming that the machine is making a turn to the right, then the first working element will turn to the right around the traction wheel, 24, as a center. This action will cause the extension 2 to swing to the left, thereby directing the stub tongue 4 of the following element to the left. The steering truck of that element will be bodily turned to the left and will thereby guide its working element in an arcuate path having a greater radius than that of the path described by the preceding element. In other words, each element will, at all times, follow behind the preceding one in a path substantially parallel to the path taken by said preceding element. No manually operable mechanism is therefore necessary to prevent the elements from "cutting corners", when the machine is making a turn; as the offset relation is automatically retained even under such conditions.

What we claim is:—

1. A tandem draft connection for harvesters and the like, having a plurality of working elements comprising drawing connections between said elements, guiding means on each element, connections including an offsetting rod between said guiding means and the preceding element whereby each element is guided in a path substantially parallel to the preceding element both when the machine is traveling in a straight line and when rounding a curve.

2. A tandem draft connection for harvesters and the like, having a plurality of working elements comprising drawing connections between said elements, steering trucks pivoted to said elements and connections between each truck and the preceding element whereby the elements are guided in offset relation.

3. A tandem draft connection for harvesters and the like having a plurality of working elements comprising drawing connections between said elements, steering means associated with each element and connections between each steering means and the preceding element comprising an offsetting rod whereby the elements are continually guided in offset relation.

4. A tandem draft connection for harvesters and the like having a plurality of working elements, comprising flexible drawing connections between said elements, forwardly extending tongues on said elements, steering trucks pivoted to said tongues, and connections between each element and the steering trucks of the following element, to guide each truck and the element in a path substantially parallel to the path of the preceding element.

5. A tandem draft connection for harvesters and the like having a plurality of working elements, comprising flexible drawing connections between said elements, forwardly extending tongues on said elements, steering trucks pivoted to said tongues, stub tongues carried by said trucks, and offsetting rods pivoted to said stub tongues, each of said offsetting rods having a connection with the preceding element.

6. A tandem draft connection for harvesters and the like having a plurality of working elements, comprising flexible drawing connections between said elements, forwardly extending tongues on said elements, steering trucks pivoted to said tongues, stub tongues carried by said trucks, rearwardly extending tongues on said elements and offsetting rods pivotally connecting each of said rearwardly extending tongues with the stub tongue of the following element.

In testimony whereof we affix our signatures in the present of two witnesses.

WALLACE CASWELL.
RICHARD ANDREW CASWELL.

Witnesses:
W. K. HERRICK,
E. C. HERRICK.

Copies of this patent may be obtained for five cents each, by addressing the "Commissioner of Patents, Washington, D. C."